US009416558B2

(12) United States Patent
Lange

(10) Patent No.: US 9,416,558 B2
(45) Date of Patent: Aug. 16, 2016

(54) HUNTING BLIND SHELTER

(71) Applicant: Michael A. Lange, Houston, MN (US)

(72) Inventor: Michael A. Lange, Houston, MN (US)

(*) Notice: Subject to any disclaimer, the term of this patent is extended or adjusted under 35 U.S.C. 154(b) by 0 days.

(21) Appl. No.: 14/465,232

(22) Filed: Aug. 21, 2014

(65) Prior Publication Data

US 2015/0053246 A1 Feb. 26, 2015

Related U.S. Application Data

(60) Provisional application No. 61/868,291, filed on Aug. 21, 2013.

(51) Int. Cl.
*E04H 15/54* (2006.01)
*E04H 15/00* (2006.01)
*A01M 31/02* (2006.01)

(52) U.S. Cl.
CPC ........... *E04H 15/001* (2013.01); *A01M 31/025* (2013.01); *E04H 15/54* (2013.01)

(58) Field of Classification Search
CPC ..... E04H 15/54; E04H 15/001; E04H 15/008; E04H 15/48; E04H 15/64; E04H 1/02; A01M 31/025; A01M 31/00; Y10S 135/901
USPC .......... 135/87, 93, 121, 143, 115, 901; 52/63, 52/71, 79.1, 79.5, 82–83
See application file for complete search history.

(56) References Cited

U.S. PATENT DOCUMENTS

| 3,118,186 | A | * | 1/1964 | Moss | E04H 15/008 |
| | | | | | 52/272 |
| 3,338,005 | A | * | 8/1967 | Gelsavage | E04B 1/3445 |
| | | | | | 446/109 |
| 4,910,928 | A | * | 3/1990 | Cellar, Jr. | E04H 1/1222 |
| | | | | | 52/282.1 |
| 5,142,833 | A | * | 9/1992 | Svehaug | A01M 31/00 |
| | | | | | 428/919 |
| 5,172,525 | A | * | 12/1992 | Cook | E04H 15/001 |
| | | | | | 135/901 |
| 5,592,960 | A | * | 1/1997 | Williams | A01M 31/025 |
| | | | | | 135/117 |
| 5,983,913 | A | * | 11/1999 | Fargason | A01M 31/025 |
| | | | | | 135/901 |
| 6,250,021 | B1 | * | 6/2001 | Ferrara, Jr. | E04B 1/344 |
| | | | | | 446/423 |
| 6,942,065 | B1 | * | 9/2005 | Price | A01M 31/025 |
| | | | | | 135/901 |
| 7,040,335 | B1 | | 5/2006 | Ransom | |
| 7,121,290 | B2 | | 10/2006 | Eastman, II | |
| 8,707,634 | B2 | * | 4/2014 | Anklam | E04H 1/1205 |
| | | | | | 52/79.1 |
| 8,763,315 | B2 | * | 7/2014 | Hartman | E04B 1/3445 |
| | | | | | 52/71 |
| 2009/0272043 | A1 | * | 11/2009 | Zwern | E04B 1/34321 |
| | | | | | 52/27 |
| 2013/0139863 | A1 | * | 6/2013 | Fields | E04H 15/58 |
| | | | | | 135/117 |

* cited by examiner

*Primary Examiner* — Winnie Yip
(74) *Attorney, Agent, or Firm* — Patterson Thuente Pedersen, P.A.

(57) ABSTRACT

A hunting blind structure having a plurality of vertical sides and one or more roof sections comprising a structured insulate material connected together to form an interior space and an exterior area, the hunting blind structure having at least one window and at least one door, the exterior area having a rubber material layer, the rubber material layer forming an integral rubber hinge with the window structure and/or door structure, such that the rubber hinges provide a weatherproof hinge and allow the users to open the opening structures into the interior space during normal operation.

20 Claims, 5 Drawing Sheets

HUNTING BLIND SHELTER

RELATED APPLICATION

The present application claims the benefit of U.S. Provisional Application No. 61/868,291, filed Aug. 21, 2013, which is incorporated herein in its entirety by reference.

FIELD OF THE INVENTION

The present invention relates generally to a hunting blind shelter, and more particularly to a multisided hunting blind shelter having an exterior rubber layer that is an integral hinge with a window structure and/or door structures such that the windows and/or doors have a rubber hinge that allow the window structure and/or door structure to swing into the interior of the shelter.

BACKGROUND OF THE INVENTION

There are various different hunting blinds and stands used by hunters and/or nature observers to camouflage the occupant from the wildlife game and/or to provide the occupant with protection from the elements. Such hunting blinds can be permanent, semi-permanent and portable structures which are placed in or near the natural habitat of the wildlife game being hunted. Hunting blinds that are permanent or semi-permanent are often stationary and made of wood and/or metal materials and often painted or otherwise camouflaged to blend with the trees and foliage of the surrounding environment to conceal the occupants from the wildlife game. Other hunting blinds that are collapsible and/or portable are often made of a combination of poles and camouflaged fabric material, much like tents, such that the hunting blind can be reduced in size and be portable enough to be easily transported from one location to another. These hunting blinds come in a variety of shapes and sizes, and often the hunting blinds are mounted on the ground, an elevated platform, or in a tree stand with a ladder or other means to reach the hunting blind.

During a given hunting season or wildlife observation period, the occupant of the hunting blind can experience a wide array of weather. Such weather includes inclement weather, such as snow, sleet, rain, extreme cold and the like. In this inclement weather, the portable hunting blinds provide very little protection. The more stationary hunting blinds may provide more protection, but the hunting blind is not conducive to being moved or relocated because of the size, shape, weight and/or complexity of the hunting blind.

Wildlife also can often sense human scent emanating from the wildlife blind. Wildlife game can frequently sense human scent from great distances and will avoid such areas. Some portable hunting blinds attempt to address this issue with fabric that may contain a scent-suppressing material, such as U.S. Pat. No. 7,121,290. Others have replaced the window openings with a light transmissive material that can be punctured by an arrow, bullet or other projective fired from within the enclosure in the direction of the wildlife game, such as that described in U.S. Pat. No. 7,040,335. These hunting blinds, however, often need to be staked down to be stationary, which is not always possible in cold weather, and the fabric-like material does not always provide enough barrier to keep the occupant warm enough throughout the entire hunting period.

Therefore, there is a need for a hunting blind structure that protects the occupant from inclement weather, that is stationary enough during use yet portable enough to be transported from location to location, and that provides scent containment features, all of which permit the occupant to enjoy the hunting and/or observation experience without the occupant experiencing the unpleasantness of inclement weather or the wildlife game avoiding the area of the hunting blind due to the occupant's scent.

SUMMARY OF THE INVENTION

The present invention is directed at a hunting blind structure having a plurality of sides comprised of a structured insulate material connected together to form an interior space and an exterior area, the hunting blind structure having at least one window and at least one door, a rubber material layer adhered to the exterior area, the rubber material layer forming an integral rubber hinge attached to at least one window structure and/or at least one door structure to provide a rubber hinge for the window and/or door, such that the rubber hinges of the at least one window and/or at least one door are weatherproof and allow the window and/or door structures to open into the interior space.

In some aspects, the structured insulate material is insulation board having a thickness from about 0.5 inches to about 4 inches, in some aspects about 0.75 inches to about 3 inches, and in some aspects about 1 inch. In some aspects, the adjacent sides are connected to each other without the use of a fastener. In some aspects, adjacent sides are connected to each other with an adhesive.

In some aspects, the hunting blind structure has four sides to about twelve sides or more, in some aspects four sides, in some aspects five sides, in some aspects six sides, in some aspects seven sides, in some aspects eight sides, in some aspects nine sides, in some aspects ten sides, in some aspects eleven sides, and in some other aspects twelve sides. In some aspects, the hunting blind structure has a door located on one of the plurality of sides and a window in at least one of the plurality of sides. In some aspects, the hunting blind structure has a door located on one of the plurality of sides and a window in each of the other plurality of sides. In some aspects, the hunting blind structure has at least two doors. In some aspects, the hunting blind structure has at least two windows. In some aspects, the hunting blind structure has at least two windows located on one of the plurality of sides. In some aspects, the door has at least one window located therein, such that one of the sides has a rubber hinge connected to a door structure and a rubber hinge connected to a window structure within the door structure.

In some aspects, the hunting blind structure has a base to which the plurality of sides are attached. The base may have the same number of sections as the plurality of sides. In some aspects, the base forms the geometric structure of the hunting blind, such that the number of sides of the base corresponds with the number of sides. In some aspects, the bottom portion of the plurality of sides are connected to the base. In some aspects, the bottom portion of the plurality of sides are connected to the base with an adhesive and no fastener. In some aspects, the bottom portion of the plurality of sides are connected to the base with one or more fasteners and/or adhesive.

In some aspects, the hunting blind structure has a roof. In some aspects, the roof is flat. In some aspects, the roof is domed. In some other aspects, the roof has the same number of sections as the plurality of sides such that the sections form a peak where each of the sections of the roof connect. In some aspects, each of the sections of the roof has three sides having a triangular configuration, such that the sections of the roof connect at an apex forming a roof peak. In some aspects, the roof has one or more roof openings with a roof structure that opens into the interior space. In some other aspects, the roof sections comprises insulate material, such as insulation board, with the roof structure being an insulate material that can swing into the interior space and operably couple to the roof opening.

In some aspects, the hunting blind structure contains a floor. In some aspects, the floor comprises a rubber liner layer. In some other aspects, the floor comprises a single structured insulate material, such as insulation board, that can be inserted into the interior space and operably couple to the base. In some aspects, the floor comprises two or more sections of structured insulate material that can be inserted into the interior space and operably couple to the base. In some aspects, the hunting blind structure can be used as a fish house, such that the floor contains one or more floor openings with floor structures, such as circular, square, or the like, that are much like the side windows that have a rubber hinge that allow access to the ground underneath the hunting blind structure by swinging the floor structures into the interior space and the user can access the ground through the floor opening.

In some aspects, the plurality of sides, the roof and/or floor have an exterior rubber layer. In some aspects, the exterior rubber layer also overlays and is adhered to at least a portion of the window structure of the window, door structure of the door, roof opening structure of the roof and/or floor opening structure of the floor, such that the overlayed portion provides a rubber hinge that allows the window structure(s), door(s), roof opening(s) and/or floor opening structure(s) to hinge into the interior space of the hunting blind structure, with the rubber hinge providing a weather-proof barrier hinge.

In some aspects, the exterior rubber layer overlays and is adhered to at least a portion of the opening structure (i.e., window, door, roof and/or floor), such that the overlayed portion of the exterior rubber layer is an integral hinge with the opening structure. In some aspects, the exterior rubber layer overlays substantially the entire opening structure, such as the door structure, window structure, roof structure and/or floor structure. In some aspects, the exterior rubber layer overlays only a portion of one edge of the opening structure in a range from about ¼ inch to about 6 inches, in some aspects about ½ inch to about 4 inches, in some aspects about 1 inch to about 3 inches, and in some other aspects about 1 inch to about 2 inches. In some aspects, the exterior rubber layer overlays the corresponding opening structure, such that the integral rubber hinge is in a vertical position located proximate a side of the opening and opening structure. In some aspects, the exterior rubber layer overlays the corresponding opening structure, such that the integral rubber hinge is in a horizontal position located proximate a top or bottom side of the opening and opening structure.

In some aspects, the exterior rubber layer overlays and is adhered to at least a portion of at least one window structure, such that the overlayed portion of the exterior rubber layer is an integral hinge with the window structure. In some aspects, the exterior rubber layer overlays only a portion of the at least one window structure in a range from about ¼ inch to about 6 inches, in some aspects about ½ inch to about 4 inches, in some aspects about 1 inch to about 3 inches, and in some other aspects about 1 inch to about 2 inches. In some aspects, the exterior rubber layer overlays and is adhered to the window structure, such that the integral rubber hinge is in a vertical position located proximate a side of the window opening and window structure. In some aspects, the exterior rubber layer overlays and is adhered to the window structure, such that the integral rubber hinge is in a horizontal position located proximate a top or bottom side of the window opening and window structure.

In some aspects, the window structure, doors, roof opening structure and/or floor opening structure have a means for keeping the corresponding structure in the open and/or closed position.

In some aspects, the window structure, doors, roof opening structure and/or floor opening structure have a magnet inserted in an edge that operably interacts with a ferromagnetic material or another magnet of the corresponding location of the wall structure, roof structure or floor structure. In some aspects, the magnet is located in the structure and the opening structure has a corresponding ferromagnetic material or magnet.

In some aspects, the window structure, doors, roof opening structure and/or floor opening structure have a rotatable clip located in the interior of the hunting blind on the side or floor that operably holds the corresponding structure in the open position. In some aspects, the window structure, doors, roof opening structure and/or floor opening structure have a clip located in the interior of the hunting blind on the side or floor that operably holds the corresponding structure in the closed position by positioning the opening structure between the clip and the interior face of the corresponding side. In some aspects, the clip is a rotatable or swivel clip, such that the clip can be rotated to position the corresponding structure in the locked or unlocked position when the corresponding structure is in the open or closed position.

In some aspects, the opening structure is a translucent material, such as glass, plastic, composite material or the like, which allows the user to see through the opening structure when the respective opening has the opening structure in a closed position. In some aspects, the opening structure is bigger than the corresponding opening, such that when the opening structure is in the closed position a portion of the opening structure overlaps with the side in the interior. In some aspects, the opening structure overlaps at least one side of the opening. In some aspects, the opening structure overlaps at least one side of the opening in a range between about ¼ inch to about 4 inches, in some aspects about ½ inch to about 3 inches, and in some other aspects about ¾ inch to about 2 inches.

In some aspects, the window structure is a translucent material, such as glass, plastic, composite material or the like, which allows the user to see through the window structure when the respective window opening has the window structure in a closed position. In some aspects, the window structure is bigger than the corresponding window opening, such that when the window structure is in the closed position a portion of the window structure overlaps with the side in the interior side. In some aspects, the window structure overlaps at least one side of the window opening. In some aspects, the window structure overlaps at least one side of the window opening in a range between about ¼ inch to about 4 inches, in some aspects about ½ inch to about 3 inches, and in some other aspects about ¾ inch to about 2 inches.

In some aspects, the opening structure (i.e., door structure, window structure, roof structure and/or floor structure) comprises a cut portion of the side after the exterior and/or interior rubber layer has been applied, such that the opening structure comprises the same material as the sides (i.e., structured insulate material or the like with the adhered rubber layer). In some aspects, the opening structure is slightly smaller in size than the corresponding opening, such that when the opening structure is in the closed position the opening structure fits substantially within the opening, with the corresponding rubber layers adjacent each.

In some aspects, the hunting blind structure has a see-through fabric material located above the window that can be rolled down when the window structure is in the open or closed position.

In some aspects, the window has a beveled cut located on the outside of the side below the window opening that permits precipitation, such as snow, sleet, rain and the like to run away from the interior space.

In some aspects, the opening structure (i.e., window structure, doors, roof opening structure and/or floor opening structure) contains a felt material proximately located the side of the opening structure that is closest the side when opening and closing on the interior space side, such that the opening structure can be opened quietly without the insulate material comprising the opening structure making very much noise, if any noise at all.

In some aspects, the opening structure contains a rubber material layer on the interior space side. In some aspects, the interior rubber layer has an overlap that is not adhered to the opening structure that extends beyond the corresponding opening structure, such that the overlap provides a weather barrier seal when the opening structure (i.e., window, door, roof and/or floor) is in the closed position.

In some aspects, the opening structure contains a rubber material layer on the interior space side. In some aspects, the interior rubber layer has an overlap that is adhered to the opening structure that extends beyond the corresponding opening structure, such that the overlap provides a rubber hinge and a weather barrier seal when the opening structure (i.e., window, door, roof and/or floor) is in the closed position.

In some aspects, the hunting blind structure contains a fastening means within the interior space attached to one or more ropes. The one or more ropes allow the hunting blind structure to be pulled to a desired location. In some aspects, the hunting blind structure can be placed on its side, such that it can be pulled on its side to a ground mount location. In some aspects, the hunting blind structure can be placed on its side and pulled up into the air, such that the hunting blind structure can be placed on a hunting platform elevated from the ground location. In some aspects, the exterior rubber layer not only provides a scent-free barrier and barrier from the weather elements, but the exterior rubber layer also provides a friction-reducing contact between snow and/or ice for the hunting blind structure to be easily pulled from one location to another.

DETAILED DESCRIPTION OF THE DRAWINGS

Figure 1:
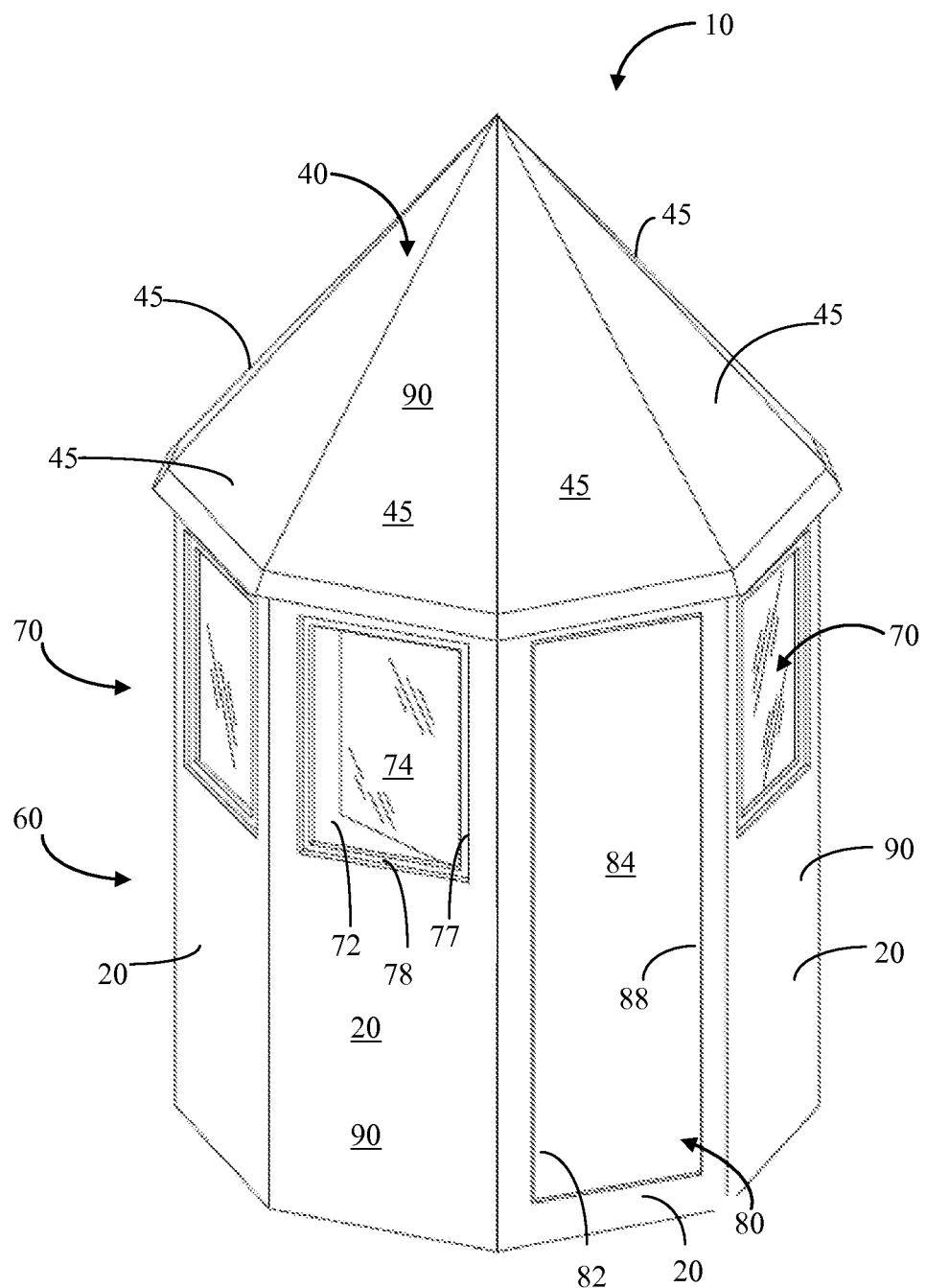
FIG. 1 is a perspective view of a hunting blind structure according to an embodiment of the present invention.

As generally illustrated in FIGS. 1-4B is a hunting blind structure 10 of the present invention and its various structural components. The hunting blind structure 10 has a plurality of sides 20 that can be connected to a base 30, and a roof 40 comprised of a plurality of sections 45, the plurality of sides 20 and roof sections 45 defining an interior area 50 therein.

The plurality of sides 20 and/or roof sections 45 may comprise a structured insulate material. The plurality of sides 2 can be fastened to the base 30. The plurality of sides 20 and/or roof 40 connected with each form the interior space 50 (shown best in FIG. 3) and an exterior area 60 (shown best in FIG. 1). The plurality of sides 20 may have adjacent sides 20 connected together with an adhering material, such as a caulk material, adhesive or the like, such that adjacent sides 20 can be connected to each other without the use of fasteners. The roof sections 45 may have adjacent sections 45 connected together with an adhering material, such as a caulk material, adhesive or the like, such that adjacent sections 45 can be connected to each other without the use of fasteners. The roof 40 can be connected to the plurality of sides 20 with an adhering material, such as a caulk material, adhesive or the like, in that the sides 20 and roof 40 can be connected to each other without the use of fasteners.

The hunting blind structure 10 has at least one window 70 comprising a window opening 72 and a window structure 74 and at least one door 80 comprising a door opening 82 and a door structure 84.

A rubber material layer 90 is adhered to at least the plurality of sides 20 and/or roof sections 45 on the exterior area 60 of the sides 20 and/or roof sections 45. The rubber material layer 90 adhered to the exterior area of the sides 20 and/or roof sections 45 provides an exterior weatherproof barrier layer and also provides additional support for the structured insulate material.

Figure 4A:
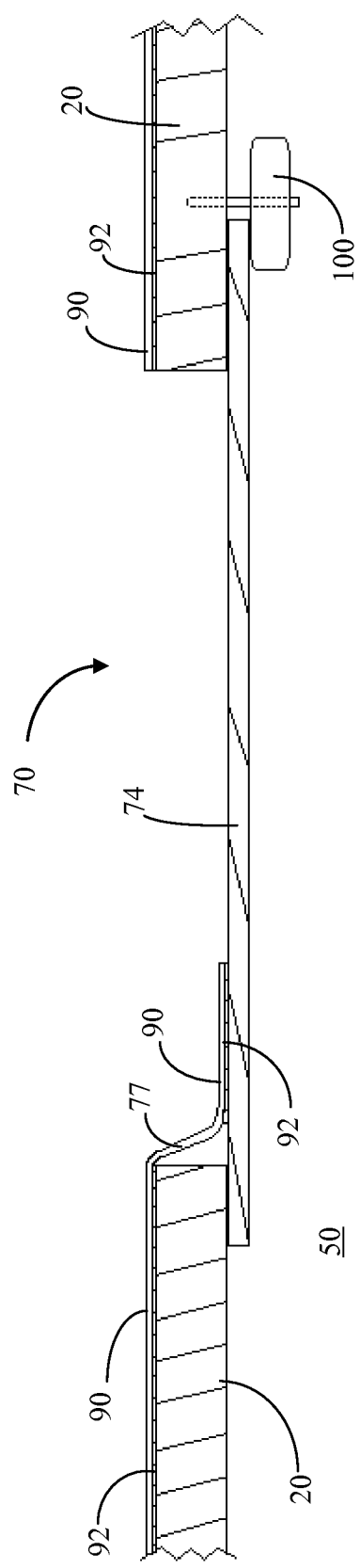
FIG. 4A is a cross-section view of an opening, shown as a window with a window opening and a window structure in a closed position, with the rubber material layer applied to the exterior of the hunting blind structure partially overlapping and adhered to a window structure forming a rubber hinge according to certain aspects of the present invention.
Figure 4B:
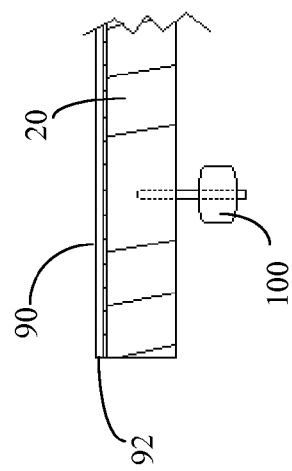
FIG. 4B is a is a cross-section view of the opening in FIG. 4A, with the window structure unlocked and the rubber hinge allowing the window structure to swing into the interior area of the hunting blind structure according to certain aspects of the present invention.
Figure 4B:
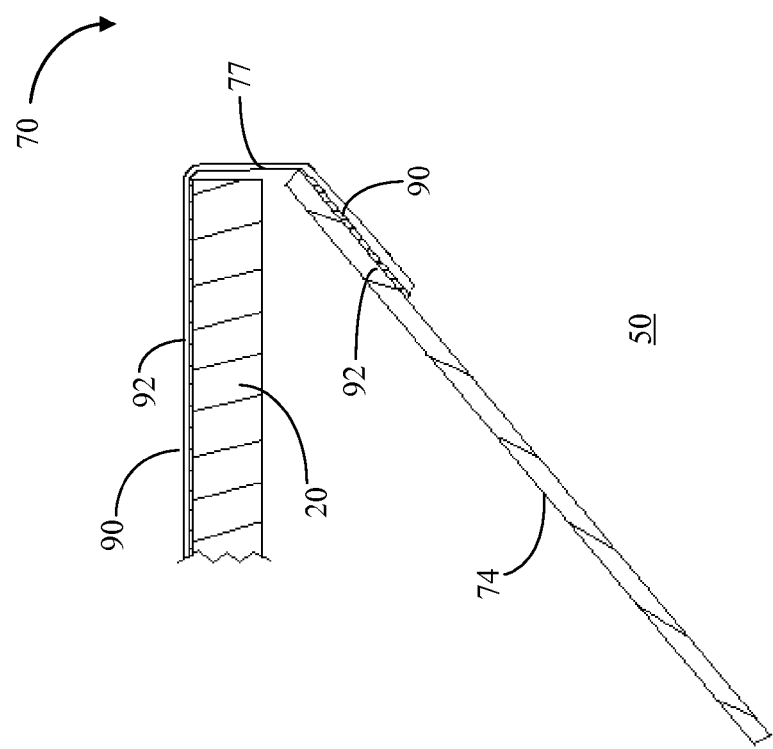

The rubber material layer 90 can also overlap and be adhered to at least a portion of the window structure 74 and/or at least a portion of the door structure 84, such that the overlapping rubber material layer 90 adhered to the opening structure forms an integral rubber hinge 77, 88, respectively, thereto, such that the rubber hinge 77 of the at least one window and the rubber hinge 88 of the at least one door 80 allows these structures to hinge into the interior space 50 while providing a weatherproof rubber hinge 77, 88, as illustrated in FIGS. 4A and 4B for a window 70, which is equally applicable for a door 80.

In some aspects, the rubber material layer 90 is adhered to the structured insulate material with an adhesive 92, which may further provide structural support of the sides 20 being operably connected together. The rubber material layer 90 not only allows the formation of a integral rubber hinge 77, 88 for a window 70 and/or door 80, but the rubber material layer 90 also provides the ability to better waterproof, windproof and scentproof the hunting blind structure 10. The rubber material layer 90 may comprise a thickness of about 0.032 inches to about 0.5 inches. In some aspects, the rubber material layer 90 is an ethylene propylene diene monomer material that is about 45 mil to about 60 mil.

Figure 2:
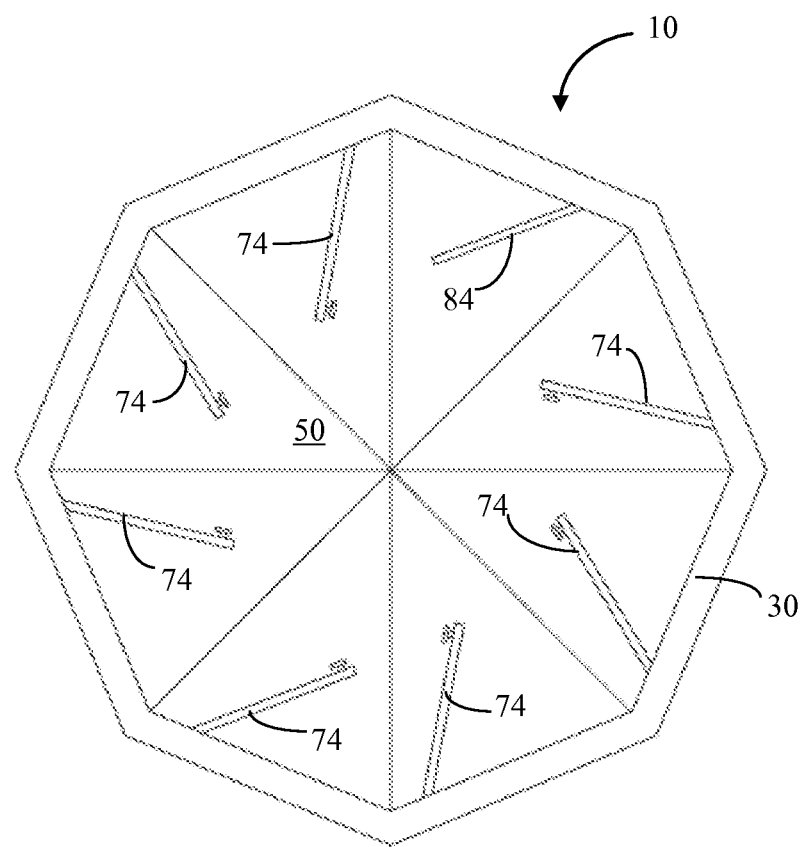
FIG. 2 is a bottom view of the hunting blind structure of FIG. 1, with each of the window structures and door structure in an open or partially opened position.

As shown best in FIG. 2, which shows a hunting blind structure 10 with a base 30 to which each of the sides 20 are connected, the base 30 can comprise gussets onto which each of the sides 20 can be connected to form the geometrically shaped hunting blind structure 10. While the base 30 is shown to be an octagon, the base 30 may comprise three up to about twelve sides or more, depending upon the number of desired sides 20, without departing from the spirit and scope of the present invention. For ease of reference, the figures show the hunting blind structure 10 in an octagon shape, although hunting blind structures with three sides up to twelve sides or more are equally applicable to this disclosure.

In some aspects, the structured insulate material that comprises the sides 20 is fiberglass insulation board having a thickness from about 0.5 inches to about 4 inches, in some aspects about 0.75 inches to about 3 inches, and in some aspects about 1 inch. Each of the sides 20 may be about 12 inches to about 48 inches wide, in some aspects about 18 inches to about 36 inches wide, in some aspects about 20 inches to about 24 inches wide. Each of the sides 20 may be about 3.5 feet to about 7 feet, in some aspects about 4 feet to about 6 feet, and in some aspects about 4.5 feet to about 5.5 feet tall.

The hunting blind structure 10 has a door 80 located on at least one of the sides 20 and a window 70 in at least one of the plurality of sides 20. In some aspects, the hunting blind structure 10 has a door 80 located on one of the plurality of sides 20 and a window 70 in each of the other plurality of sides 20. The door 80 and window 70 may comprise various shapes and sizes. In some aspects, the door 80 is substantially rectangular and in some other aspects the door is oval shaped. In some aspects, the window 70 is square, in some aspects rectangular, in some aspects oval shaped, and in some other aspects circular. In some aspects, at least one of the sides 20 may comprise a door 80 and a window 70, in some aspects the window 70 located within the door 80.

Each of the windows 70 comprise a window structure 72 that swings into the interior area 50 on the respective rubber hinge 77 and that can be closed within the window opening 74. The windows 70 in FIG. 1 are shown in both a closed position and a partially open position, partially open in FIG. 2, and fully closed in FIG. 3. A representative window 70 having the window structure 74 swinging into the interior area 50 on the rubber hinge 77 from a closed position is best shown in FIGS. 4A and 4B, as the window structure 74 is in the closed and locked position in FIG. 4A and in an opened (but unlocked) position in FIG. 4B.

In the instances where the window structure 72 comprises the same material as the side 20 and is formed by cutting a portion of the side 20 to form a window 70, the window 70 may have a beveled cut on both the window structure 72 and the interior area 50 side of the side 20 to enable the window 70 to open properly while maintaining the integral rubber layer 90 on the exterior surface 60 and the rubber hinge 77 that allows the window 20 to swing into the interior area 50. This area of the beveled cut may also have a felt-like material layer applied to provide further quietness when the window 20 is opened and closed. As shown in FIG. 1, which shows the exterior area 60 of a window 70, the side 20 below the window 70 may have a bevel angle 78 located along the bottom edge of the window 70 on the side 20 proximate the window 70, such that weather elements such as rain, snow, sleet and the like run down the sides 20 and towards the exterior area 60 and away from the interior area 50.

The door comprises a door structure 82 that swings into the interior area 50 on the rubber hinge 88 and that can be closed within the door opening 84. The rubber hinge 88 functions much of the same as that shown in FIGS. 4A and 4B with respect to a window 70. The door 80 is shown closed in FIGS. 1 and 3 with the door structure 82 contained within door opening 84, and partially open in FIG. 2 with door structure 82 swung into the interior area 50. Much like the beveled cut on the window structure 72 and the interior area 50 side of the side 20, in the instances where the door structure 82 comprises the same material as the side 20 and is formed by cutting a portion of the side 20 to form a door 80, the door structure 82 may also have a beveled cut on the interior area 50 side, as can the corresponding side 20 to enable the door 80 to open properly while maintaining the integral rubber layer 90 on the exterior surface 60 and the rubber hinge 88 that allows the door 80 to swing into the interior area 50. This area of the beveled cut may also have a felt-like material layer applied to provide further quietness when the door 80 is opened and closed.

The roof 40 of the hunting blind structure 10 may be flat, domed, or have a peak. In the aspect of a flat roof 40 (not shown), the same insulate material may attach to the sides 20 with the rubber material layer 90 applied thereto to provide the exterior area 60 of the roof 40. In the aspect of a domed roof 40 (not shown), trusses may be run from one side 20 to an opposite side 20 to enable a slight increase centrally located, with the rubber material layer 90 applied thereto. In the aspect of a roof 40 with a peak, such as shown in the FIG. 1, the roof 40 has the same number of sections 45 as the plurality of sides 20 such that it forms a peak where each of the sections of the roof 40 meet to form an apex. Each of the sections 45 can be operably connected to the top end of the respective side 20 using a caulk material, adhesive or the like. Similarly, adjacent sections 45 can also be operably connected to each other using a caulk material, adhesive or the like, such that the use of fasteners is not needed. The rubber material layer 90 is then applied over the insulate material and adhered thereto to form an exterior area 60 of the roof 40. In some aspects (not shown), the roof has one or more roof openings with corresponding roof structures, much like a window 70, such that the roof structure opens into the interior area 50 on a rubber hinge that is integral with the rubber material layer applied to the outside of the hunting blind structure 10.

In some aspects, as shown in FIG. 1, the roof 40 may have an overhang with respect to the sides 20, such that weather elements, such as rain, snow and sleet drip off of the roof 40 and not into windows 70 and/or door 80. In other aspects, the connection of the roof 40 to the sides 20 does not have an overhang.

In some aspects, the hunting blind structure 10 contains a floor. The floor may comprise a rubber liner layer. In some other aspects, the floor comprises a single structured insulate material, such as fiberglass insulation board, that can be inserted into the interior space 50 and operably couple to the base 30. In some aspects, the floor comprises two or more sections of structured insulate material that can be inserted into the interior space 50 and operably couple to the base 30. In some aspects, the hunting blind structure 10 can be used as a fish house, such that the floor contains one or more floor openings, such as circular, square, or the like, that are much like the windows 70 that have a rubber hinge 77 that allow access to the ground underneath the hunting blind structure 10. In this aspect, a rubber material layer 90 is provided on the exterior area 60 under the base 30 of the hunting blind structure 10, with a floor structure that swings into the interior area 50 on a rubber hinge that is integral with the rubber material layer 90. Much like the window 70 and door 80, the floor opening may have a bevel cut on the inside area that allows the floor opening to properly hinge.

As provided in the foregoing disclosure, the plurality of sides 20, the roof 40 and/or floor has an exterior rubber layer 90. In some aspects, the exterior rubber layer 90 also overlays the window structure 72, door structure 82, roof opening structure and/or floor opening structure to provide a rubber hinge that allows the windows, doors, roof openings and/or floor opening structures to hinge into the interior space 50 of the hunting blind structure 10. The integral rubber hinge also provides a weatherproof and scent proof capability.

In some aspects, the window structure 72, door structure 82, roof opening structure and/or floor opening structure may have a magnet or ferromagnetic material inserted in an edge that operably interacts with a ferromagnetic material or another magnet of the corresponding location of the wall structure, roof structure or floor structure. In some aspects, the magnet is located in the structure and the opening structure has a corresponding ferromagnetic material or magnet.

In some aspects, the opening structure (i.e., window structure, door structure, roof structure and/or floor structure), which is shown as a window structure in FIGS. 4A and 4B, may comprise a clip 100 that operable locks and unlocks the opening structure in the closed and/or opened position. As shown in FIG. 4A, the clip can be fastened to the interior side 50 of one of the sides 20 proximate the window 70, such that the opening structure (shown as window structure 74) can be closed between the side 20 and the clip 100. As shown in FIG. 4B, the clip can be rotated or swiveled to allow the opening structure to be released and swung open on the rubber hinge 77. As shown in FIGS. 4A and 4B, the rubber hinge 77 is comprised of the same integral rubber material layer 90 as adhered to the side using an adhesive 92. The adhesive 92 between the window structure 74 and rubber material layer 90 may be the same or different than the adhesive located between the side 20 and rubber material layer 90.

In some aspects, the exterior rubber layer adhered to the opening structure overlays only a portion of one edge of the opening structure, such as shown in FIGS. 4A and 4B for the window structure 74. The overlap area of the rubber layer 90 adhered to the opening structure may be in a range from about ¼ inch to about 6 inches, in some aspects about ½ inch to about 4 inches, in some aspects about 1 inch to about 3 inches, and in some other aspects about 1 inch to about 2 inches.

In some aspects, the exterior rubber layer overlays the corresponding opening structure, such that the integral rubber hinge is in a vertical position located proximate a side of the opening and opening structure. In some aspects, the exterior rubber layer overlays the corresponding opening structure, such that the integral rubber hinge is in a horizontal position located proximate a top or bottom side of the opening and opening structure.

In some aspects, the exterior rubber layer adhered to the opening structure overlays substantially the entire surface of the opening structure, such as shown in FIG. 1 for the door structure 84.

Figure 3:
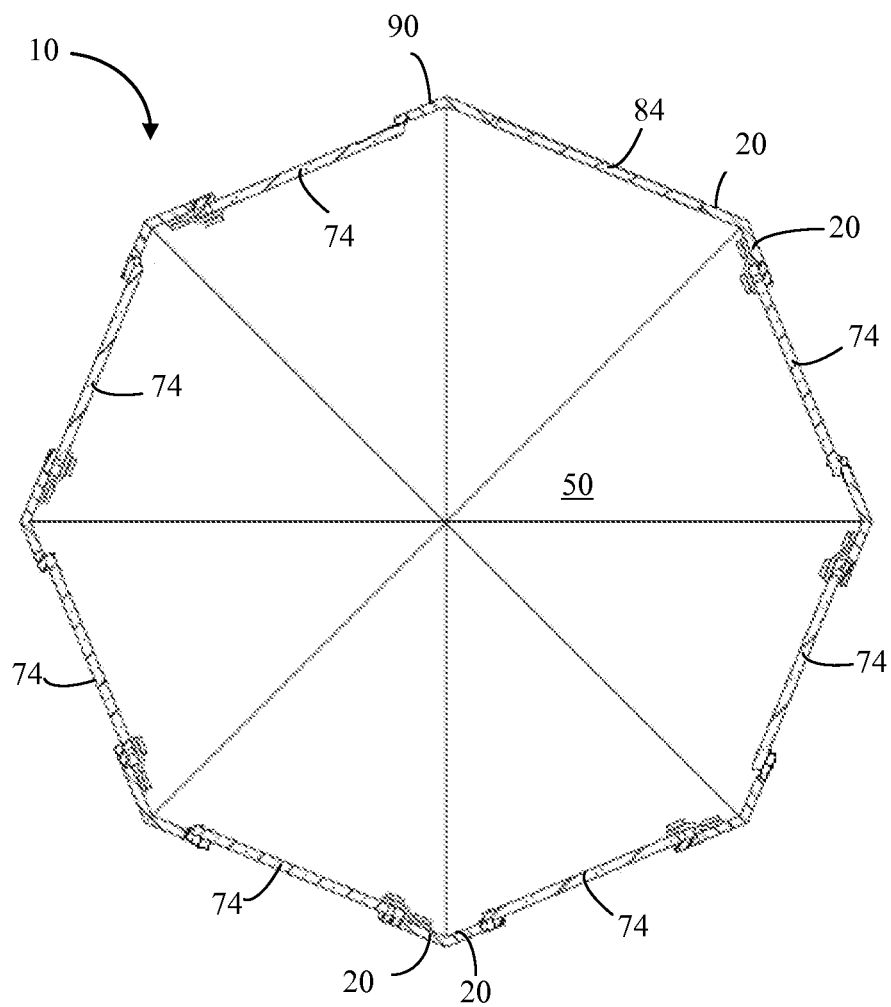
FIG. 3 is a cross-sectional view of the hunting blind structure of FIG. 1, with each of the window structures and door structures in a closed position.

In some aspects, the window structure 72 is a translucent material, such as glass, plastic, composite material or the like, such as shown in FIG. 1, which allows the user to see through the window structure when the respective window opening has the window structure in a closed position. In some aspects, as shown in FIGS. 3 and 4A, at least one side of the window structure 74 is bigger than the corresponding window opening 72, such that when the window structure 74 is in the closed position a portion of the window structure 74 overlaps with the side 20 in the interior side 50. In some aspects, the window structure 74 overlaps two or more sides of the window opening 72. In some aspects, the window structure 74 overlaps at least one side of the window opening 72 in a range between about ¼ inch to about 4 inches, in some aspects about ½ inch to about 3 inches, and in some other aspects about ¾ inch to about 2 inches.

The hunting blind structure 10 may also have a see-through fabric material located above the window 70 on the interior area 50 side, such that the see-through fabric material can be rolled down when the window 70 is in the open position.

In an alternative embodiment, the hunting blind structure 10 may have a fabric sock that is applied over the exterior area 60. The fabric sock may be various colors or patterns, such as a camouflage for hunting, a white color for blending in with the natural snow elements during the winter, or the like. The fabric sock may have openings that correspond with the windows 70 and door 80 such that the openings in the fabric sock can be opened with the window 70 and/or door 80. In some aspects, the windows 70 and door 80 have one or more means for fastening to the fabric sock, such as a button snap, velcro, or zipper.

The hunting blind structure 10 may also contain a fastening means (such as an eyebolt or the like) proximately located on the base 30 within the interior space 50 that is attached to one or more ropes. The one or more ropes allow the hunting blind structure 10 to be placed on one or more of its sides 20 and pulled to a desired location. In some aspects, the hunting blind structure 10 can be placed on one of its sides 20, such that it can be pulled on its side 20 to a ground mount location. In some aspects, the hunting blind structure 10 can be placed on its side 20 and pulled up into the air with the rope configuration, such that the hunting blind structure 10 can be placed on a hunting platform elevated from the ground location. In some aspects, the exterior rubber layer 90 not only provides a scent-free barrier and barrier from the weather elements, but the exterior rubber layer 90 also provides a friction-reducing contact between snow and/or ice for the hunting blind structure 10 to be easily pulled from one location to another.

The interior area 50 of the hunting blind structure 10 may have a place for the occupant to sit, such as a bench, stool, chair, or the like.

In one embodiment of the present invention, the hunting blind structure 10 comprises four sides 20 having a door 80 located on one of the sides 20 and a window 70 located in each of the other three sides 20. The sides 20 are each about 5 feet tall and about 20 inches wide, with a roof 40 having four sections 45 that are about 3 feet long. This particular embodiment has a centrally located peak at about 6 feet 10 inches. Each of the sides 20 and roof 40 comprises an insulative board material that is about ¾ inch thick and has an exterior rubber layer 90 that is about 45 mils thick. The hunting blind structure 10 weighs about 85 to about 90 pounds.

In another embodiment of the present invention, the hunting blind structure 10 comprises six sides 20 having a door 80 located on one of the sides 20 and a window 70 located in each of the other five sides 20. The sides 20 are each about 4 feet tall and about 30 inches wide, with a roof 40 have six sections 45 that has a centrally located peak at about 6 feet 6 inches. Each of the sides 20 and roof 40 comprises an insulative board material that is about ¾ inch thick and has an exterior rubber layer 90 that is about 45 mils thick. The hunting blind structure 10 weighs about 100 to about 105 pounds.

The invention claimed is:
1. A hunting blind structure comprising:
   a plurality of sides comprising a structured insulate material connected together to form an interior space and an exterior area;
   at least one window located on a first side of said plurality of sides, said at least one window comprising a window opening and a window structure, said window structure having an interior window structure side and an exterior window structure side;

at least one door located on a second side of said plurality of sides, said at least one door comprising a door opening and a door structure, said door structure having an interior door structure side and an exterior door structure side; and a rubber material layer adhered to at least a portion the exterior area of at least one of the plurality of sides and at least a portion of said exterior window structure side, and at least a portion of said exterior door structure side;

wherein said rubber material layer adhered to said portion of said exterior window structure side forms an integral rubber window hinge between said first exterior area side of said plurality of sides and said exterior window structure side allowing said window structure to open into said interior space; and wherein said rubber material layer adhered to said portion of said exterior door structure side forms an integral rubber door hinge between said second exterior area side of said plurality of sides and said exterior door structure side allowing said door structure to open into said interior space.

2. The hunting blind structure of claim 1, comprising a second window located on a third side of said plurality of sides, said second window comprising a second window opening and a second window structure, said rubber material layer adhered to at least a portion of said second window structure, wherein said rubber material layer adhered to said portion of said second window structure forms a second integral rubber window hinge between said third side of said plurality of sides and said second window structure allowing said second window structure to open into said interior space.

3. The hunting blind structure of claim 1, wherein said plurality of sides comprises an insulation board having a thickness from about 0.5 inches to about 4 inches.

4. The hunting blind structure of claim 1, further comprising a base that operably connects to bottom sides of said plurality of sides, wherein said base having the same number of sides as said plurality of sides.

5. The hunting blind structure of claim 1, further comprising a roof having a peak, said roof having a plurality of sections, each section connected to each adjacent section.

6. The hunting blind structure of claim 5, wherein said rubber material layer adhered to an exterior area of said roof.

7. The hunting blind structure of claim 6, wherein said plurality of sections is equal in number to said plurality of sides.

8. The hunting blind structure of claim 1, wherein said window structure comprises a translucent material.

9. The hunting blind structure of claim 8, wherein said rubber material layer adhered to said window structure is adhered to said window on one side and forming an overlap strip between said rubber material layer and said window structure in a range from about 1 inch to about 6 inches.

10. The hunting blind structure of claim 9, wherein said window structure is larger than said window opening, such that said window structure operably engages and overlaps at least one side of the interior surface of said side proximate the window opening when the window structure is in a closed position.

11. The hunting blind structure of claim 10, wherein said overlap of said window structure with said side of the interior surface is in a range of about ½ inch to about four inches.

12. The hunting blind structure of claim 1, wherein said door structure comprises the same material as said plurality of sides, and wherein said rubber material layer is adhered to substantially the entire exterior surface of said door structure.

13. The hunting blind structure of claim 1, further comprising a locking means for keeping said window structure in a closed position.

14. The hunting blind structure of claim 1, wherein said exterior areas of said side proximate a bottom side of said window opening has is angled, such that precipitation during normal use runs away from said interior space.

15. The hunting blind structure of claim 1, further comprising a roof, said roof having a plurality of sections, each section connected to each adjacent section, and each section connected to a top edge of said plurality of substantially vertical sides.

16. The hunting blind structure of claim 15, wherein said rubber material layer adhered to an exterior area of said roof.

17. A hunting blind structure comprising:
at least four substantially vertical sides comprising a structured insulate material, each of said sides connected to a base and each of said sides connected to each adjacent side to form an interior space and an exterior area;
at least one window located on a first substantially vertical side of said four substantially vertical sides, said at least one window comprising a window opening and a window structure, said window structure having an interior window structure side and an exterior window structure side;
a door located on a second side of said four substantially vertical sides, said door comprising a door opening and a door structure, said door structure having an interior door structure side and an exterior door structure side;
a rubber material layer adhered to the exterior area of four substantially vertical sides, at least a portion of said exterior window structure side, and at least a portion of said exterior door structure side;
wherein said rubber material layer adhered to said exterior area portion of said window structure side forms an integral rubber window hinge between said exterior area of said first substantially vertical side and said window structure allowing said window structure to open into said interior space; and
wherein said rubber material layer adhered to said exterior area portion of said door structure side forms an integral rubber door hinge between said exterior area of said second substantially vertical side and said door structure allowing said door structure to open into said interior space.

18. A hunting blind structure comprising:
a plurality of substantially vertical sides, each of said plurality of sides connected to each adjacent side to form an interior space and an exterior area;
at least one window located on a first substantially vertical side of said plurality of substantially vertical sides, said at least one window comprising a window opening and a window structure, said window structure having an interior window structure side and an exterior window structure side;
a rubber material layer adhered to the exterior area of said plurality of substantially vertical sides and at least a portion of said exterior window structures side, wherein said rubber material layer adhered to said portion of said exterior window structure side and said exterior area of said first substantially vertical side forms an integral rubber window hinge between said first substantially vertical side and said window structure allowing said window structure to open into said interior space.

19. The hunting blind structure of claim 18, wherein said window structure comprises a translucent material.

20. The hunting blind structure of claim 19, wherein said rubber material layer is adhered to one side of said window structure forming an overlap strip between said rubber material and said window structure, said overlap strip being about 1 inch to about 6 inches.

\* \* \* \* \*